UNITED STATES PATENT OFFICE.

GEORGE KELLY, OF HINSDALE, ILLINOIS.

INSULATING MEANS AND METHOD OF MANUFACTURING THE SAME.

No. 830,441.   Specification of Letters Patent.   Patented Sept. 4, 1906.

Application filed October 30, 1905. Serial No. 285,178.

*To all whom it may concern:*

Be it known that I, GEORGE KELLY, a citizen of the United States, residing at Hinsdale, in the county of Dupage and State of Illinois, have invented a new and useful Insulating Means and Method of Manufacturing the Same, of which the following is a specification.

This invention relates to insulating means especially adapted for electrical work.

One object is to provide a novel article which will withstand a high voltage, is fireproof, and will not shrink during the manufacture thereof.

A further and important object is to provide a novel method of manufacture wherein the various ingredients are made to perform a plurality of functions, said method being inexpensive to carry out and resulting in an article having the above-described desirable characteristics.

In carrying out the invention a compound is first formed of an elastic vegetable gum and liquid glass. The gum preferably employed is rubber or "pontianak," the commercial name of a gum from Pontianak, Borneo, or a combination of the two. This compound preferably consists of about five per cent. of gum and about ninety-five per cent. of liquid glass, by weight. By "liquid glass" is meant silicate of sodium, silicate of potassium, or the like, the same registering from 40° to 45° Baumé. The proper proportion of gum is introduced into the liquid glass, and the latter acts as a solvent for the former. The resulting combination is a liquid compound having excellent cementitious or adhesive qualities. Mineral wool is then moistened with the above liquid binder by mixing the two together. Enough of this may be employed to make a stiff but plastic body. This body is then allowed to remain until a preliminary set has taken place, after which the same is passed through mixing-rollers to thoroughly incorporate the ingredients. The material is afterward formed into sheets or molded articles, which are thereupon heated under pressure, or, in other words, vulcanized under pressure, until the desired degree of hardness is attained, this vulcanization under pressure being an important step. The result is an article that is capable of withstanding a high voltage, is weather and fire proof, will not shrink in the hardening or vulcanizing process, and is suitable in every way for insulating purposes. Moreover, in the method of manufacture the different characteristics of certain of the ingredients are made use of to effect the proper combination of parts. Thus the liquid glass, which when combined with the rubber or corresponding gum produces an excellent binder, serves as a solvent for such gum, doing away with the necessity of an extraneous solvent and making this step very simple and inexpensive. Furthermore, the sulfur and lime which is contained in mineral wool combines with the rubber or gum in the vulcanizing step, so that ordinarily no other vulcanizing agent is required. On this account mineral wool blown from lead slag, being rich in sulfur, is perhaps preferred. This wool, moreover, being of a dark color appears better in the combination than the lighter grades and furthermore, is, because of these features, objectionable for general use, so that it may be obtained at less cost. At the same time the whiter grades can be successfully employed, particularly if blown from metal slag. If the mineral wool is manufactured from rock, the amount of sulfur contained therein being generally small, it sometimes becomes desirable to add this ingredient to the composition in order to secure the best results. Furthermore, if desired, a filler of oxid zinc, whiting, or other well-known material may be introduced.

For cheaper articles, where a fireproof insulator is not needed, instead of the mineral wool other fiber—such as flax, cotton, jute, and the like—may be employed. In such case the same liquid binder is used and is applied to the fiber in the same manner as above described in connection with mineral wool. It will of course be understood that sulfur or other vulcanizing agent must be added to secure the proper vulcanizing of the ingredients when the vulcanizing process is performed.

Having thus described my invention, what I claim as new, and desire to secure by Letters Patent, is—

1. The method of manufacturing insulating material which consists in combining liquid glass, gum and mineral wool and vulcanizing the same.

2. The method of manufacturing insulating material, which consists in dissolving a gum in liquid glass, mixing the composition with mineral wool and vulcanizing the mixture.

3. The method of manufacturing insulating material, which consists in dissolving an elastic vegetable gum in liquid glass, mixing the composition with mineral wool and afterward vulcanizing the same.

4. The method of manufacturing insulating material, which consists in dissolving a gum by and in liquid glass, mixing the composition with mineral wool to form a stiff though plastic body, forming said body into the desired shape, allowing it to set, and afterward vulcanizing the same.

5. The method of manufacturing insulating material, which consists in forming a cementitious body of substantially five per cent. of elastic vegetable gum and ninety-five per cent. of liquid glass, moistening a body of mineral wool with said binder, and vulcanizing the composition under pressure.

6. The method of manufacturing insulating material, which consists in combining liquid glass, gum and fiber, and vulcanizing the same.

7. The method of manufacturing insulating material, which consists in dissolving a gum in liquid glass, mixing the composition with a body of fiber, and afterward vulcanizing the mixture.

8. The method of manufacturing insulating material, which consists in dissolving elastic vegetable gum by and in liquid glass, mixing the composition with fiber, and vulcanizing the mixture.

9. The method of manufacturing insulating material, which consists in dissolving an elastic vegetable gum in liquid glass, mixing the composition with fiber to form a stiff plastic body, forming said body into the desired article or articles, allowing said article or articles to set, and afterward vulcanizing the same under pressure.

10. As an article of manufacture, a vulcanized insulating body including fiber, vegetable gum and liquid glass.

11. As an article of manufacture, a vulcanized insulating body including a solution of vegetable gum and liquid glass combined with mineral wool.

In testimony that I claim the foregoing as my own I have hereto affixed my signature in the presence of two witnesses.

GEORGE KELLY.

Witnesses:
JOHN H. SIGGERS,
GEORGE TATE.